(12) United States Patent
Eisinger et al.

(10) Patent No.: US 6,987,152 B1
(45) Date of Patent: Jan. 17, 2006

(54) FEED PURIFICATION AT AMBIENT TEMPERATURE

(75) Inventors: Ronald Steven Eisinger, Charleston, WV (US); Daniel Paul Zilker, Jr., Charleston, WV (US); James Leland Swecker, II, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/143,906

(22) Filed: Jun. 2, 2005

Related U.S. Application Data (60) Provisional application No. 60/642,895, filed on Jan. 11, 2005.

(51) Int. Cl.
*C07C 7/00* (2006.01)
(52) U.S. Cl. .................. 526/77; 585/518; 585/802; 585/824
(58) Field of Classification Search .............. 526/77; 585/518, 802, 824
See application file for complete search history.

(56) References Cited

U.S. PATENT DOCUMENTS

| | | | |
|---|---|---|---|
| 2,837,587 A * | 6/1958 | Hogan et al. ............ 585/251 |
| 3,432,573 A * | 3/1969 | Keil ........................ 585/518 |
| 3,523,110 A * | 8/1970 | Eichenbaum ............ 526/68 |
| 3,779,712 A | 12/1973 | Calvert et al. |
| 4,003,712 A | 1/1977 | Miller |
| 4,011,382 A | 3/1977 | Levine et al. |
| 4,077,904 A | 3/1978 | Noshay et al. |
| 4,115,639 A | 9/1978 | Brown et al. |
| 4,302,565 A | 11/1981 | Goeke et al. |
| 4,302,566 A | 11/1981 | Karol et al. |
| 4,482,687 A | 11/1984 | Noshay et al. |
| 4,521,387 A | 6/1985 | Broecker et al. |
| 4,530,910 A | 7/1985 | Mross et al. |
| 4,543,399 A | 9/1985 | Jenkins, III et al. |
| 4,560,671 A | 12/1985 | Gross et al. |
| 4,564,605 A | 1/1986 | Collomb-Ceccarini et al. |
| 4,585,840 A | 4/1986 | Gross et al. |
| 4,588,790 A | 5/1986 | Jenkins, III et al. |
| 4,621,592 A | 11/1986 | McInerney |
| 4,621,952 A | 11/1986 | Aronson |
| 4,721,763 A | 1/1988 | Bailly et al. |
| 4,803,251 A | 2/1989 | Goode et al. |
| 4,879,359 A | 11/1989 | Chamla et al. |
| 4,933,149 A | 6/1990 | Rhee et al. |
| 4,960,741 A | 10/1990 | Bailly et al. |
| 4,994,534 A | 2/1991 | Rhee et al. |
| RE33,683 E | 9/1991 | Allen et al. |
| 5,047,468 A | 9/1991 | Lee et al. |
| 5,093,415 A | 3/1992 | Brady, III et al. |
| 5,200,477 A | 4/1993 | Baker et al. |
| 5,270,408 A | 12/1993 | Craddock, III et al. |
| 5,288,933 A | 2/1994 | Kao et al. |
| 5,290,745 A | 3/1994 | Jorgensen et al. |
| 5,317,036 A | 5/1994 | Brady, III et al. |
| 5,318,935 A | 6/1994 | Canich et al. |
| 5,352,749 A | 10/1994 | DeChellis et al. |
| 5,405,901 A | 4/1995 | Danielle et al. |
| 5,428,118 A | 6/1995 | Painter et al. |
| 5,453,471 A | 9/1995 | Bernier et al. |
| 5,461,123 A | 10/1995 | Song et al. |
| 5,518,973 A | 5/1996 | Miro et al. |
| 5,525,678 A | 6/1996 | Mink et al. |
| 5,627,242 A | 5/1997 | Jacobsen et al. |
| 5,728,782 A | 3/1998 | Brady et al. |
| 5,731,381 A | 3/1998 | Apecetche et al. |
| 5,744,556 A | 4/1998 | Keller et al. |
| 5,834,571 A | 11/1998 | Bernier et al. |
| 5,879,805 A | 3/1999 | Brady et al. |
| 5,889,128 A | 3/1999 | Schrock et al. |
| 5,912,309 A | 6/1999 | Lee et al. |
| 6,004,677 A | 12/1999 | Cann et al. |
| 6,011,128 A | 1/2000 | Eisinger et al. |
| 6,063,877 A | 5/2000 | Kocian et al. |
| 6,096,840 A | 8/2000 | Bernier et al. |
| 6,111,162 A * | 8/2000 | Rossini et al. ............ 585/824 |
| 6,214,903 B1 | 4/2001 | Eisinger et al. |
| 6,255,420 B1 | 7/2001 | Dietz, III et al. |
| 6,271,325 B1 | 8/2001 | McConville et al. |
| 6,278,033 B1 | 8/2001 | Flick et al. |
| 6,300,429 B1 | 10/2001 | Spriggs et al. |
| 6,306,981 B1 | 10/2001 | Brown et al. |
| 6,333,389 B2 | 12/2001 | Whiteker et al. |
| 6,384,156 B1 | 5/2002 | Bernier et al. |
| 6,441,107 B1 | 8/2002 | Muruganandam et al. |

(Continued)

FOREIGN PATENT DOCUMENTS

EP 0 102 503 3/1984

(Continued)

*Primary Examiner*—Fred Teskin
(74) *Attorney, Agent, or Firm*—Kevin M. Faulkner (57) ABSTRACT

A method for olefin polymerization is provided. A feed stream comprising more than 0.1 ppm by volume of oxygen and 0.3 ppm by volume of water is passed through a first packed bed to selectively remove at least a portion of the oxygen. The feed stream is then passed through a second packed bed to selectively remove at least a portion of the water, providing a purified feed stream comprising less than 0.1 ppm by volume of oxygen and 0.3 ppm by volume of water. Both the first and second packed beds operate at a temperature of from about 0° C. to about 50° C. The purified feed stream is then passed to a polymerization reactor.

19 Claims, 2 Drawing Sheets

U.S. PATENT DOCUMENTS

| | | |
|---|---|---|
| 6,472,483 B1 | 10/2002 | Goode et al. |
| 6,562,905 B1 | 5/2003 | Nummila-Pakarinen et al. |
| 6,627,713 B2 | 9/2003 | Bernier et al. |
| 2003/0236365 A1 | 12/2003 | Tian et al. |
| 2004/0052708 A1 | 3/2004 | Rao |

FOREIGN PATENT DOCUMENTS

| | | |
|---|---|---|
| EP | 0 103 120 | 3/1984 |
| EP | 0 231 102 | 3/1988 |
| EP | 0 703 246 | 3/1996 |
| WO | WO 99/01460 | 1/1999 |

* cited by examiner

FEED PURIFICATION AT AMBIENT TEMPERATURE

CROSS-REFERENCE TO RELATED APPLICATIONS

This application claims benefit of U.S. provisional patent application Ser. No. 60/642,895, filed Jan. 11, 2005, which is herein incorporated by reference.

BACKGROUND OF THE INVENTION

1. Field of the Invention

Embodiments of the present invention generally relate to methods of olefin polymerization. More particularly, embodiments described relate to feed stream purification prior to olefin polymerization.

2. Description of the Related Art

Newer polymerization catalysts have the unique ability to produce polymers having product properties that have not been previously obtained. Those polymerization catalysts are typically expensive and highly sensitive to impurities in the feed streams. Impurities in the feed streams poison or otherwise deactivate the polymerization catalysts, thereby significantly decreasing the catalyst activity and performance. As such, the presence of impurities dramatically increases production costs and is a detriment to product quality. There is a need, therefore, for a cost-effective way to remove impurities in the feed streams prior to polymerization.

SUMMARY OF THE INVENTION

A method for olefin polymerization is provided. In at least one embodiment, the method comprises providing a feed stream comprising more than 0.1 ppm by volume of oxygen and 0.3 ppm by volume of water, passing the feed stream through a first packed bed to selectively remove at least a portion of the oxygen, and passing the feed stream through a second packed bed to selectively remove at least a portion of the water, providing a purified feed stream comprising less than 0.1 ppm by volume of oxygen and 0.3 ppm by volume of water. Both the first and second packed beds operate at a temperature of from about 0° C. to about 50° C. The purified feed stream is then passed to a polymerization reactor.

In at least one other embodiment, the method comprises providing a feed stream comprising more than 5 ppm by volume of acetylene, 0.5 ppm by weight of sulfur-containing compounds, 0.3 ppm by volume of carbon monoxide, 0.5 ppm by volume of carbon dioxide, 0.1 ppm by volume of oxygen, 0.3 ppm by volume of water, and 1 ppm by volume of methanol; passing the feed stream through a first packed bed to selectively remove at least a portion of the sulfur-containing compounds; passing the feed stream through a second packed bed to selectively remove at least a portion of the acetylene and oxygen; passing the feed stream through a third packed bed to selectively remove at least a portion of the carbon monoxide; passing the feed stream through a fourth packed bed to selectively remove at least a portion of the carbon dioxide, water, and methanol, providing a purified feed stream comprising less than 5 ppm by volume of acetylene, 0.5 ppm by weight of sulfur-containing compounds, 0.3 ppm by volume of carbon monoxide, 0.5 ppm by volume of carbon dioxide, 0.1 ppm by volume of oxygen, 0.3 ppm by volume of water, and 1 ppm by volume of methanol, wherein the first, second, third and fourth packed beds each operate at a temperature of from about 0° C. to about 50° C.; and then passing the purified feed stream to a polymerization reactor.

In at least one other embodiment, the method comprises passing an olefin feed stream comprising from 0.1 to 5 ppm by volume of oxygen through a packed bed comprising a reduced metal-containing reactant that chemically reacts with at least a portion of the oxygen and generates carbon dioxide, wherein the reaction takes place at conditions sufficient to produce less than 0.3 ppm by volume of the carbon dioxide, thereby providing a purified olefin feed stream having less than 0.1 ppm by volume of oxygen and less than 0.3 ppm by volume of additional carbon dioxide, and then passing the purified olefin feed stream to a polymerization reactor, the reactor housing a fluidized bed comprising a polymerization catalyst sensitive to oxygen and carbon dioxide.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

BRIEF DESCRIPTION OF THE DRAWINGS

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Various terms as used herein are defined below. To the extent a term used in a claim is not defined below, it should be given the broadest definition persons in the pertinent art have given that term as reflected in at least one printed publication or issued patent.

The term "impurities" as used herein refers to a component or compound that reduces the activity of a polymerization catalyst or adversely affects the operability of the olefin polymerization process. Illustrative impurities include, but are not limited to, oxygen, carbon monoxide, carbon dioxide, hydrocarbons having oxygen-containing functional groups such as alcohols, aldehydes, ketones, organic acids, some esters, and peroxides, water, sulfur-containing compounds, and arsine. Illustrative sulfur-containing compounds include, but are not limited to hydrogen sulfide, carbonyl sulfide, and mercaptans having the general formula R—SH where R is an alkyl group having one to 20 carbon atoms.

The term "feed stream" as used herein refers to a raw material, either gas phase or liquid phase, used in a polymerization process to produce a polymer product. For example, a feed stream may be any olefin monomer including substituted and unsubstituted alkenes having two to 10 carbon atoms, such as ethylene, propylene, 1-butene, 1-pentene, 1-hexene, 1-octene, 1-decene, 1-dodecene, styrene, and derivatives thereof. The feed stream may also be a gas stream such as nitrogen or hydrogen. The feed stream may further include one or more nonreactive alkanes that are condensable in the polymerization process for removing the heat of reaction. Illustrative nonreactive alkanes include, but are not limited to, propane, butane, isobutane, pentane, isopentane, hexane, isomers thereof and derivatives thereof.

The term "packed bed" as used herein refers to a material for impurity removal (i.e. "purification material") that is fixed within a container/vessel and that is not fluidized. The purification material may be one or more catalysts, absorbents, adsorbents, reactants, and any combination thereof. Each packed bed may be contained in a single container/vessel, such as a vertical pressure vessel, for example. Two or more packed beds of the same purification material may be arranged in parallel or in series. Alternatively, two or more packed beds of different purification material may be arranged on top of one another within a single container/vessel. That arrangement is referred to as a "stacked bed."

Figure 1:
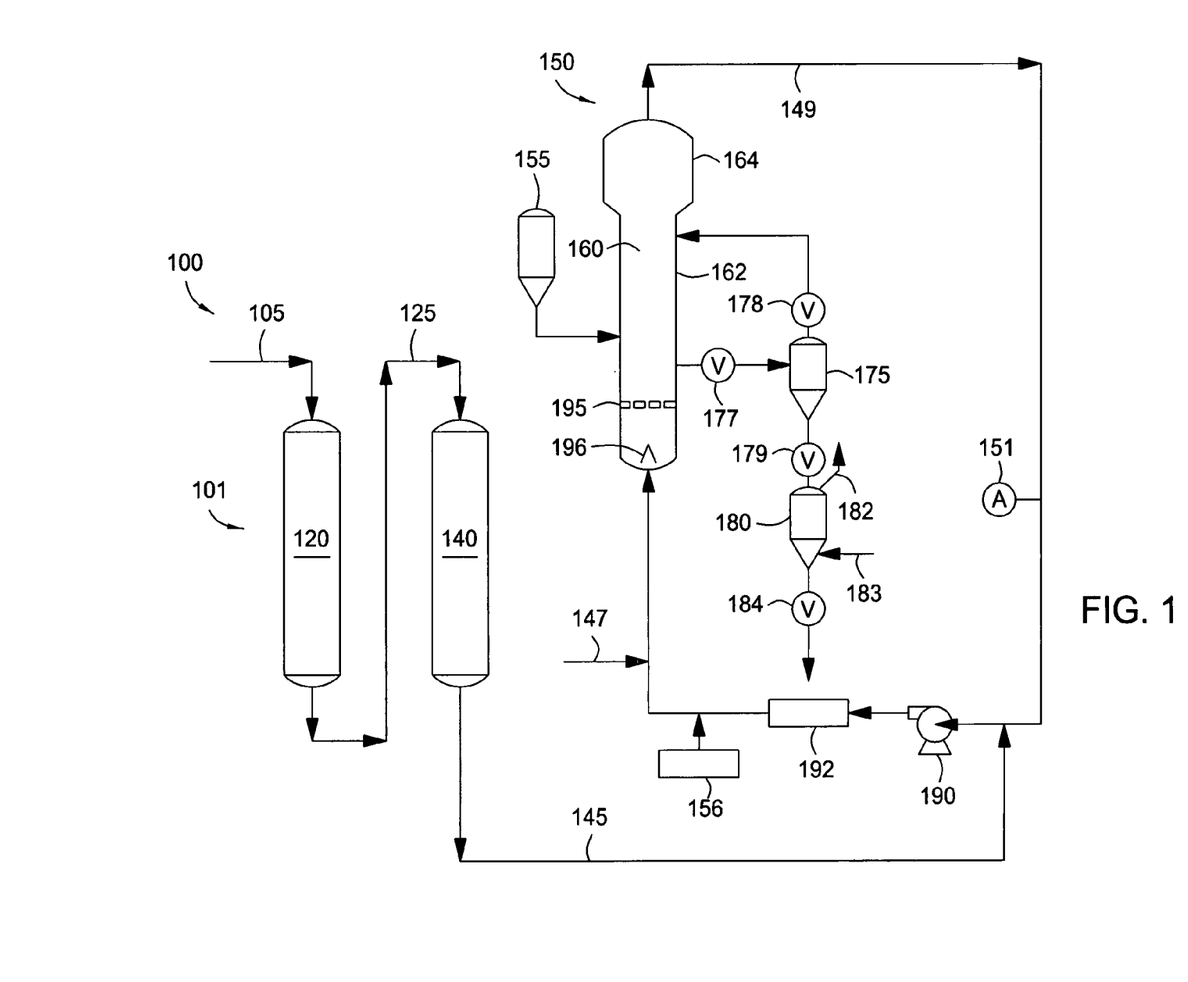
FIG. 1 schematically depicts an exemplary process for olefin polymerization according to one or more embodiments described.

FIG. 1 schematically depicts an exemplary process 100 for olefin polymerization according to embodiments described herein. The process 100 includes a purification section 101 to remove one or more impurities from a feed stream 105 prior to a polymerization section 150. The purification section 101 can include one or more reactors/vessels that each contains one or more packed beds of purification material for impurity removal. As shown in FIG. 1, the purification section 101 can include one or more first packed beds 120 (only one is shown) for removing one or more impurities and one or more second packed beds 140 (only one is shown) for removing one or more other impurities not removed in the first packed beds 120.

In addition to the raw material, the feed stream 105 may include one or more impurities, such as oxygen and water for example, in an amount that exceeds the tolerance level of the polymerization catalyst. Such impurities are removed in the purification section 101. For example the feed stream 105 can include more than 0.1 ppm by volume (ppmv) of oxygen and 0.3 ppmv of water. In one or more embodiments, the feed stream 105 includes more than 0.5 ppm by volume (ppmv) of oxygen and 0.5 ppmv of water In one or more embodiments, the feed stream 105 includes of from about 0.1 ppmv to about 10 ppmv of oxygen and of from about 0.3 ppmv to about 10 ppmv of water. In one or more embodiments, the feed stream 105 includes of from about 0.3 ppmv to about 5 ppmv of oxygen and of from about 0.5 ppmv to about 5 ppmv of water.

The oxygen in the feed stream 105 is first removed by passing the feed stream 105 to the one or more first packed beds 120 to provide a stream 125 that contains less than 0.1 ppm by volume (ppmv) of oxygen. The water is then removed by passing the stream 125 to the one or more second packed beds 140 to provide a stream 145 that contains less than 0.3 ppm by volume (ppmv) of water. Preferably, the oxygen is removed from the stream 105 to undetectable limits.

Preferably, the packed beds 120 and 140 operate at ambient temperatures so that no external heating and/or cooling equipment are needed for the feed streams. More preferably, the packed beds 120 and 140 operate at the same ambient temperature. For example, the packed beds 120 and 140 can operate at a temperature below 90° C., such as below 50° C. In one or more embodiments, the packed beds 120 and 140 operate at a temperature ranging of from a low of about 0° C., 5° C., 10° C., or 20° C. to a high of about 30° C., 40° C., 50° C. or 90° C.

The one or more packed beds 120 or "first packed bed 120" may include any purification material for removing oxygen at ambient temperature. Such purification materials include absorbents, adsorbents, catalysts, reactants, and combinations thereof. In one or more embodiments, the first packed bed 120 includes one or more metals supported on a metal oxide carrier. Such metals can include copper, zinc, palladium, platinum, gold and silver, as described in U.S. Pat. No. 6,278,033. A preferred copper catalyst is the UT-2000 catalyst which is obtainable from Univation Technologies, Inc. Other illustrative metallic copper catalysts include the T-4427B and T-4492 RS catalysts which are commercially available from Süd-Chemie AG. To remove oxygen from the feed stream 105, the one or more metals are in a chemically reduced state to capture the oxygen. The oxygen, therefore, combines with the reduced metal to form a metal oxide that can be later re-reduced using a regeneration stream of nitrogen and hydrogen (not shown). The regeneration stream carries off the removed oxygen as water, leaving behind a reduced metal ready for additional oxygen removal. Additional details can be found in U.S. Pat. No. 6,278,033.

Carbon dioxide can be produced at higher temperatures in the presence of the purification material. Therefore, the first packed bed 120 is preferably operated at a temperature sufficient for oxygen removal in the first packed bed 120 but at a temperature that minimizes the production of carbon dioxide within the first packed bed 120. Preferably, the temperature of the first packed bed is controlled such that less than about 0.3 ppmv of carbon dioxide is generated in the first packed bed 120. In one or more embodiments, the temperature of the first packed bed 120 is controlled such that less than about 0.5 ppmv of carbon dioxide is generated in the first packed bed 120. In one or more embodiments, the temperature of the first packed bed 120 is such that from less than about 0.2 ppmv to about 0.5 ppmv of carbon dioxide is generated in the first packed bed 120.

Preferably, the water is removed from the stream 125 to undetectable limits. As mentioned above, the packed bed 140 or "second packed bed 140" preferably operates at the same temperature as the first packed bed 120. The second packed bed 140 includes a purification material for selectively removing water. The second packed bed 140 can also contain a purification material for selectively removing other oxygen-containing compounds and polar species from the stream 125. Illustrative purification materials include molecular sieves and activated alumina. Suitable molecular sieves are commercially available from UOP. Illustrative activated aluminas include Selexsorb® COS and CD, which are commercially available from Alcoa.

Since the packed beds 120 and 140 operate at ambient temperature, preferably the same temperature, no external heating or cooling whether upstream, downstream or between the beds 120 and 140, is required. As such, capital costs for equipment and construction are dramatically reduced as are operating costs. Maintenance costs are also reduced by not having additional heating and cooling equipment in the purification section 101.

Polymerization Section 150

The purified stream 145 is then passed to the polymerization section 150. An illustrative polymerization section 150 can include a reactor 160 in fluid communication with one or more discharge tanks 175 (only one shown), surge tanks 180 (only one shown), and recycle compressors 190 (only one shown). The polymerization section 150 can also include more than one reactor 160 arranged in series, parallel, or configured independent from the other reactors, each reactor having its own associated tanks 175, 180 and compressors 190 or alternatively, sharing any one or more of the associated tanks 175, 180 and compressors 190. For simplicity and ease of description, embodiments of the invention will be further described in the context of a single reactor train.

In one or more embodiments, the reactor 160 includes a reaction zone 162 in fluid communication with a velocity reduction zone 164. The reaction zone 162 includes a bed of growing polymer particles, formed polymer particles and catalyst particles fluidized by the continuous flow of polymerizable and modifying gaseous components in the form of make-up feed and recycle fluid through the reaction zone 162.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 162, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

In general, the height to diameter ratio of the reaction zone 162 can vary in the range of from about 2:1 to about 5:1. The range, of course, can vary to larger or smaller ratios and depends upon the desired production capacity. The cross-sectional area of the velocity reduction zone 164 is typically within the range of about 2 to about 3 multiplied by the cross-sectional area of the reaction zone 162.

The velocity reduction zone 164 has a larger inner diameter than the reaction zone 162. As the name suggests, the velocity reduction zone 164 slows the velocity of the gas due to the increased cross sectional area. This reduction in gas velocity drops the entrained particles into the bed, allowing only gas to flow from the reactor 160. That gas exiting the overhead of the reactor 160 is the recycle gas stream 149.

The recycle stream 149 is compressed in a compressor 190 and then passed through a heat exchange zone where heat is removed before it is returned to the bed. The heat exchange zone is typically a heat exchanger 192 which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor 160. The cooled recycle stream absorbs the heat of reaction generated by the polymerization reaction.

Preferably, the recycle stream is returned to the reactor 160 and to the fluidized bed through a gas distributor plate 195. A gas deflector 196 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,149 and 6,627,713.

A partially or totally activated precursor composition and co-catalyst (hereinafter collectively referred to as catalyst) is preferably stored for service in a catalyst reservoir 155 under a blanket of a gas which is inert to the stored material, such as nitrogen or argon. Preferably, the catalyst reservoir 155 is equipped with a feeder suitable to continuously feed the catalyst into the reactor 160. An illustrative catalyst reservoir is shown and described in U.S. Pat. No. 3,779,712, for example. A gas which is inert to the catalyst, such as nitrogen or argon, is preferably used to carry the catalyst into the bed. Preferably, the carrier gas is the same as the blanket gas used for storing the catalysts in the catalyst reservoir 155.

The catalyst is injected at a point into the bed where good mixing with polymer particles occurs. For example, the catalyst is injected into the bed at a point above the distributor plate 195. Injecting the catalyst at a point above the distribution plate 195 provides satisfactory operation of a fluidized bed polymerization reactor. Injection of the catalyst into the area below the distributor plate 195 could cause polymerization to begin there and eventually cause plugging of the distributor plate 195. Injection directly into the fluidized bed aids in distributing the catalyst uniformly throughout the bed and tends to avoid the formation of localized spots of high catalyst concentration which can cause "hot spots" to form. Injection of the catalyst into the reactor 160 above the bed can result in excessive catalyst carryover into the recycle line 149 where polymerization could occur leading to plugging of the line 149 and heat exchanger 192. An activator compound, if utilized, can be added to the reaction system either directly into the fluidized bed or downstream of the heat exchanger 192, in which case the activator is fed into the recycle system from a dispenser 156.

The monomers can be introduced into the polymerization zone in various ways including direct injection through a nozzle (not shown in the drawing) into the bed or cycle gas line 149. The monomers can also be sprayed onto the top of the bed through a nozzle (not shown) positioned above the bed, which may aid in eliminating some carryover of fines by the cycle gas stream.

Make-up fluid is fed to the bed through line 147. The composition of the make-up stream is determined by a gas analyzer 151. The gas analyzer determines the composition of the recycle stream and the composition of the make-up stream 147 is adjusted accordingly to maintain an essentially steady state gaseous composition within the reaction zone 162. The gas analyzer 151 can be a conventional gas analyzer that determines the recycle stream composition to maintain the ratios of feed stream components. Such equipment is commercially available from a wide variety of sources. The gas analyzer 151 is typically positioned to receive gas from a sampling point located between the velocity reduction zone 164 and heat exchanger 192.

The rate of polymer production in the bed depends on the rate of catalyst injection and the concentration of monomer(s) in the reaction zone. The production rate is conveniently controlled by simply adjusting the rate of catalyst injection. Since any change in the rate of catalyst injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

On discharge of particulate polymer product from reactor 160, it is desirable and preferable to separate fluid from the product and to return the fluid to the recycle line 149. There are numerous ways known to the art to accomplish this separation. In one or more embodiments, fluid and product leave the reactor 160 and enter the product discharge tanks 175 (one is shown) through valve 177, which may be a ball valve designed to have minimum restriction to flow when opened. Positioned above and below the product discharge tank 175 are conventional valves 178, 179. The valve 179 allows passage of product into the product surge tanks 180 (only one is shown).

In a typical mode of operation, valve 177 is open and valves 178,179 are in a closed position. Product and fluid enter the product discharge tank 175. Valve 177 closes and the product is allowed to settle in the product discharge tank 175. Valve 178 is then opened permitting fluid to flow from the product discharge tank 175 to the reactor 162. Valve 177 is then closed and valve 179 is opened and any product in the product discharge tank 175 flows into the product surge tank 180. Valve 179 is then closed. Product is then discharged from the product surge tank 180 through valve 184. The product can be further purged to remove residual hydrocarbons and conveyed to storage or compounding. The particular timing sequence of the valves 177, 178, 179, 184 is accomplished by the use of conventional programmable controllers which are well known in the art.

Another preferred product discharge system which may be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system (not shown) to allow venting the bed during start up and shut down. The reactor does not require the use of stirring and/or wall scraping. The recycle line 149 and the elements therein (compressor 190, heat exchanger 192) should be smooth surfaced and devoid of unnecessary obstructions so as not to impede the flow of recycle fluid or entrained particles.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251. Antistatic substances may also be added, either continuously or intermittently to prevent or neutralize static charge generation. Condensing mode operation such as disclosed in U.S. Pat. Nos. 4,543,399 and 4,588,790 can also be used to ensure operability of the fluid bed polymerization and to assist in heat removal.

Illustrative polymers which can be produced within the polymerization section 150 include, but are not limited, to the following: polyethylene, polypropylene, copolymers of ethylene, copolymers of propylene, polyisoprene (cis-1,4-polyisoprene); polystyrene; polybutadiene; SBR (polymer of butadiene copolymerized with styrene); ABS (polymer of acrylonitrile, butadiene and styrene); Nitrile (polymer of butadiene copolymerized with acrylonitrile); butyl rubber (polymer of isobutylene copolymerized with isoprene); EPR (polymer of ethylene copolymerized with propylene); EPDM (polymer of ethylene copolymerized with propylene and a diene such as hexadiene, dicyclopentadiene, or ethylidene norbornene); neoprene (polychloroprene); silicone (polydimethyl siloxane); copolymers of ethylene and vinyltrimethoxy silane; copolymers of ethylene and one or more of acrylonitrile, maleic acid esters, vinyl acetate, acrylic and methacrylic acid esters and derivatives thereof.

The conditions for polymerizations vary depending upon the monomers, catalysts and equipment availability. The specific conditions are known or readily derivable by those skilled in the art. For example, the temperatures are within the range of from about −10° C. to about 120° C., often about 15° C. to about 110° C. Pressures are within the range of from about 0.1 bar to about 100 bar, such as about 5 bar to about 50 bar, for example. Additional details of polymerization can be found in U.S. Pat. No. 6,627,713.

Figure 2:
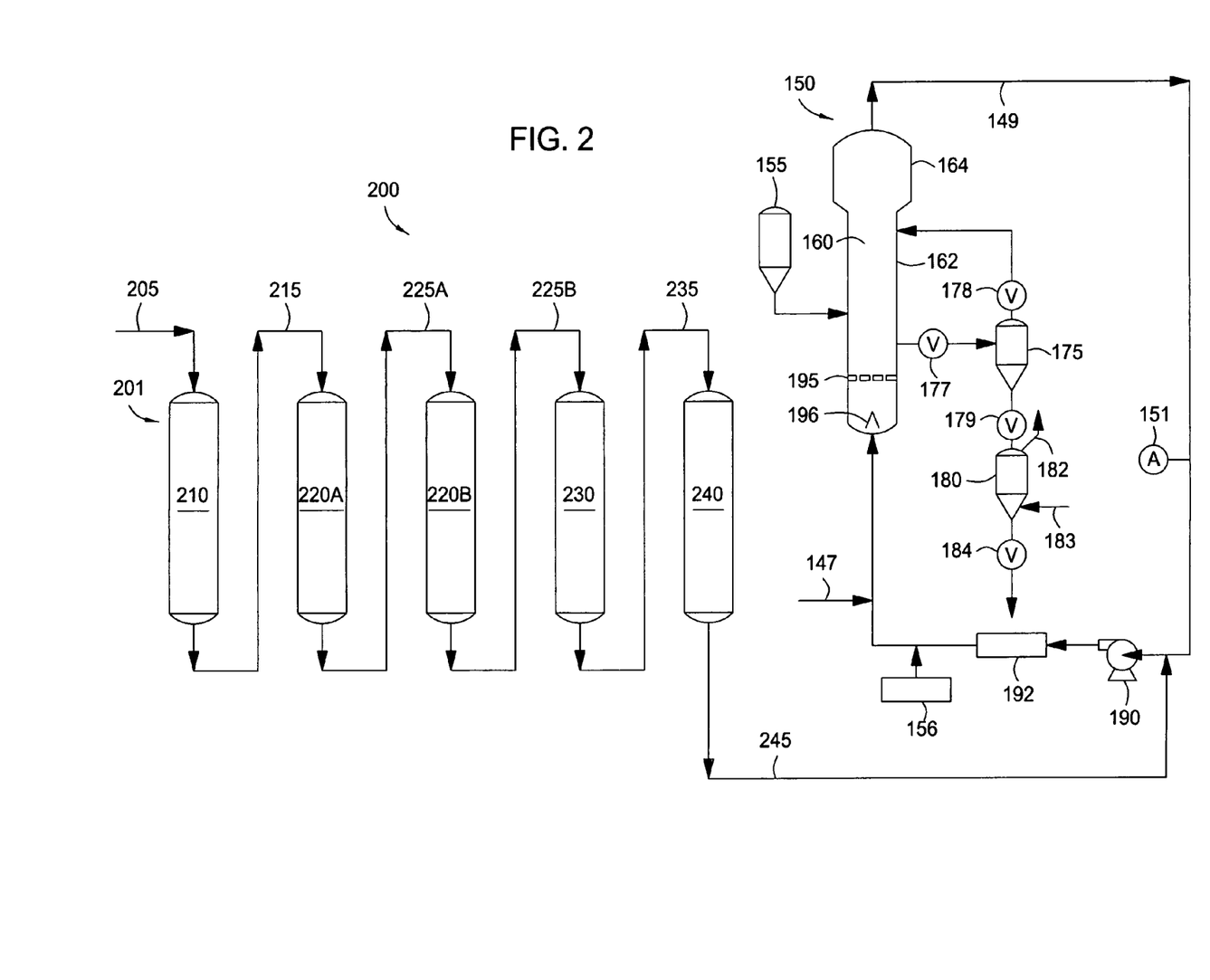
FIG. 2 schematically depicts another exemplary process for olefin polymerization according to one or more embodiments described.

FIG. 2 schematically depicts another exemplary process 200 for olefin polymerization. The process 200 includes a purification section 201 having at least four packed beds 210, 220, 230, 240 for removing impurities from a feed stream 205 prior to the polymerization section 150. Each packed bed 210, 220, 230, 240 operates at ambient temperature, and preferably at the same ambient temperature. The packed beds 210, 220, 230, 240 operate at ambient temperatures so that no external heating and/or cooling equipment is needed. For example, the packed beds 210, 220, 230, 240 can operate at a temperature below 90° C., such as below 50° C. In one or more embodiments, the packed beds 210, 220, 230, 240 operate at a temperature ranging from a low of about 0° C., 5° C., 10° C., or 20° C. to a high of about 30° C., 40° C., 50° C. or 90° C.

In one or more embodiments, the feed stream 205 contains levels of sulfur- containing compounds, oxygen, acetylene, carbon monoxide, carbon dioxide, water, and methanol that exceed the tolerance level of the polymerization catalyst. For example, the feed stream 205 includes more than 5 ppm by volume of acetylene, 0.5 ppm by weight (ppmw) of sulfur-containing compounds, 0.3 ppmv of carbon monoxide, 0.5 ppmv of carbon dioxide, 0.1 ppmv of oxygen, 0.3 ppmv of water, and 1 ppmv of methanol. In one or more embodiments, the feed stream 205 includes more than 0.5 ppmw of sulfur-containing compounds, more than 0.5 ppmv of oxygen, more than 5 ppmv of acetylene, more than 0.3 ppmv of carbon monoxide, more than 2 ppmv of carbon dioxide, more than 0.5 ppmv of water, and more than 1 ppmv of methanol.

The sulfur-containing compounds in the feed stream 105 are first removed by passing the feed stream 205 to one or more packed beds 210 or "first packed bed 210" to provide a stream 215 that contains less than 0.5 ppmw of the sulfur-containing compounds. Preferably, the sulfur-containing compounds are removed from the stream 205 to undetectable limits. A suitable purification material for removing sulfur-containing compounds is zinc oxide such as the G-72D material, which is commercially available from Süd-Chemie AG.

The stream 215 is then passed to one or more packed beds 220 or "second packed bed 220" to remove oxygen and acetylene, providing a stream 225 having less than 0.1 ppmv of oxygen and less than 5 ppmv of acetylene. Preferably, the oxygen and acetylene are removed from the stream 215 to undetectable limits. In one or more embodiments, the second packed bed 220 includes two beds 220A, 220B arranged in series as shown in FIG. 2. The purification material for removing both the oxygen and the acetylene can be the same and can be that described in reference to the packed bed 120.

In one or more embodiments, stream 215 enters the first bed 220A to remove the acetylene from the stream 215. Preferably, the first bed 220A is operated with hydrogen gas to hydrogenate the acetylene to produce saturated hydrocarbons in the presence of the metal catalyst. Stream 225A exits the first bed 220A having less than 5 ppmv of acetylene and passes to the second bed 220B. The second bed 220B then removes the oxygen from the stream 225A. Preferably, the second bed 220B operates the same as bed 120 described above with reference to FIG. 1. Preferably, stream 225B exits the second bed 220B having less than 0.1 ppmv of oxygen.

Stream 225 is then passed to one or more packed beds 230 or "third packed bed 230" to remove carbon monoxide, providing stream 235 having less than 0.3 ppmv of carbon monoxide. Preferably, the carbon monoxide is removed to undetectable limits. The purification material for removing the carbon monoxide can be the same as the purification material for removing oxygen. However, the purification material for removing carbon monoxide is used in a chemically oxidized state so that the carbon monoxide is oxidized to produce carbon dioxide. Another difference is that the spent metal catalyst is regenerated with a stream of nitrogen and oxygen to re-oxidize the metal.

The stream 235 is then passed to one or more packed beds 240 or "fourth packed bed 240" to remove carbon dioxide, water and other oxygenates if present, providing a stream 245 having less than 0.5 ppmv of carbon dioxide, 0.3 ppmv of water, and 1 ppmv of methanol. The purified stream 245 is then passed to the polymerization section 150 described above with reference to FIG. 1.

In one or more embodiments, the fourth packed bed 240 may include a first purification material dedicated to carbon dioxide removal and a second purification material dedicated to water removal. In one or more embodiments, the fourth packed bed 240 may include a first purification material dedicated to carbon dioxide removal prior to a second purification material dedicated to removal of water and other oxygenates. In one or more embodiments, the water and/or oxygenate removal can take place prior to the carbon dioxide removal.

Any purification material for selectively removing the carbon dioxide, water, and oxygenates may be used. In one or more embodiments, the first purification material contains a selective adsorbent such as one of the Alcoa activated aluminas mentioned earlier to selectively remove carbon dioxide. Likewise, the second purification material can be any purification material for selectively removing the water and/or oxygenates. Preferably, the second purification material contains molecular sieves having a pore size suitable for water and/or oxygenates removal. For example, both 3A and 13X molecular sieves are suitable for selectively adsorbing water, and 13X molecular sieves are suitable for selectively adsorbing both water and oxygenates.

As discussed with reference to FIG. 1, the packed beds 210, 220, 230, 240 each operate at ambient conditions. More significantly, the packed beds 210, 220, 230, 240 each operate at the same ambient conditions. Preferably, each bed 210, 220, 230, 240 operates within a temperature range of from about 0° C. to about 90° C. More preferably, each bed 210, 220, 230, 240 operates within a temperature range of from about 0° C. to about 50° C. In one or more embodiments, each bed 210, 220, 230, 240 operates at a temperature ranging from a low of about 0° C., 5° C., or 10° C. to a high of about 30° C., 40° C., or 50° C.

Catalyst System

Referring again to the polymerization section 150 shown in FIGS. 1 and 2, any olefin polymerization catalyst or catalyst system can be used. For example, the catalyst or catalyst system can include Ziegler-Natta catalysts, chromium-based catalysts, metallocene catalysts and other single-site catalysts, and bimetallic catalysts. The catalyst or catalyst system can also include $AlCl_3$, cobalt, iron, palladium, chromium/chromium oxide or "Phillips" catalysts. Any catalyst can be used alone or in combination with the others. In one or more embodiments, a "mixed" catalyst system is preferred.

The term "catalyst system" includes at least one "catalyst component" and at least one "activator", alternately at least one cocatalyst. The catalyst system may also include other components, such as supports, and is not limited to the catalyst component and/or activator alone or in combination. The catalyst system may include any number of catalyst components in any combination as described, as well as any activator in any combination as described.

The term "catalyst component" includes any compound that, once appropriately activated, is capable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Chromium Catalysts

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Metallocenes

Metallocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCENE-BASED POLYOLEFINS 261–377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof.

Group 15-containing Catalyst

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1. In one embodiment, the Group 15-containing catalyst includes a Group 4 imino-phenol complexes, Group 4 bis(amide) complexes, and Group 4 pyridyl-amide complexes that are active towards olefin polymerization to any extent.

Activator

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri (n-butyl)ammonium tetrakis(pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347–1374 (2000).

Ziegler-Natta Catalyst

Illustrative Ziegler-Natta catalyst compounds are disclosed in ZIEGLER CATALYSTS 363–386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Mixed Catalyst System

A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

Specific Embodiments

In at least one specific embodiment, the method for olefin polymerization includes providing a feed stream comprising more than 0.1 ppm by volume of oxygen and 0.3 ppm by volume of water; passing the feed stream through a first packed bed to selectively remove at least a portion of the oxygen; passing the feed stream through a second packed bed to selectively remove at least a portion of the water, providing a purified feed stream comprising less than 0.1 ppm by volume of oxygen and 0.3 ppm by volume of water, wherein both the first and second packed beds operate at a temperature of from about 0° C. to about 50° C.; and then passing the purified feed stream to a polymerization reactor.

The method of the above paragraph, wherein the feed stream is not externally heated or cooled between the first and second packed beds.

The method of any of the above paragraphs, wherein the first packed bed comprises reduced copper supported on a metal oxide carrier and the second packed bed comprises one or more adsorbents selective for water.

In at least one other specific embodiment, the method for olefin polymerization includes providing a feed stream comprising more than 5 ppm by volume of acetylene, 0.5 ppm by weight of sulfur-containing compounds, 0.3 ppm by volume of carbon monoxide, 0.5 ppm by volume of carbon dioxide, 0.1 ppm by volume of oxygen, 0.3 ppm by volume of water, and 1 ppm by volume of methanol; passing the feed stream through a first packed bed to selectively remove at least a portion of the sulfur-containing compounds; passing the feed stream through a second packed bed to selectively remove at least a portion of the acetylene and oxygen; passing the feed stream through a third packed bed to selectively remove at least a portion of the carbon monoxide; passing the feed stream through a fourth packed bed to selectively remove at least a portion of the carbon dioxide, water, and methanol, providing a purified feed stream comprising less than 5 ppm by volume of acetylene, 0.5 ppm by weight of sulfur-containing compounds, 0.3 ppm by volume of carbon monoxide, 0.5 ppm by volume of carbon dioxide, 0.1 ppm by volume of oxygen, 0.3 ppm by volume of water, and 1 ppm by volume of methanol, wherein the first, second, third and fourth packed beds each operate at a temperature of from about 0° C. to about 50° C.; and then passing the purified feed stream to a polymerization reactor.

The method of the above paragraph, wherein the feed stream is not externally heated or cooled between the four packed beds.

In yet another specific embodiment, the method for olefin polymerization includes passing an olefin feed stream comprising from 0.1 to 5 ppm by volume of oxygen through a packed bed comprising a reduced metal-containing reactant that chemically reacts with at least a portion of the oxygen and generates carbon dioxide, wherein the reaction takes place at conditions sufficient to produce less than 0.3 ppm by volume of the carbon dioxide, thereby providing a purified olefin feed stream having less than 0.1 ppm by volume of oxygen and less than 0.3 ppm by volume of additional carbon dioxide, and then passing the purified olefin feed stream to a polymerization reactor, the reactor housing a fluidized bed comprising a polymerization catalyst sensitive to oxygen and carbon dioxide.

The method of any of the above paragraphs, wherein both the first and second packed beds operate at a temperature of from about 20° C. to about 40° C.

The method of any of the above paragraphs, wherein the feed stream comprises nitrogen.

The method of any of the above paragraphs, wherein the reduced metal-containing reactant comprises copper supported on a metal oxide carrier.

The method of any of the above paragraphs, wherein the feed stream comprises ethylene gas or nitrogen gas.

The method of any of the above paragraphs, wherein the olefin polymerization is carried out in the gas phase.

The method of any of the above paragraphs, wherein the conditions sufficient to produce less than 0.3 ppm by volume of the carbon dioxide comprises a reaction temperature of from 0° C. to 90° C.

The method of any of the above paragraphs, wherein the polymerization catalyst is a Ziegler-Natta type catalyst, chromium-based catalyst, or metallocene catalyst.

The method of any of the above paragraphs, wherein the polymerization catalyst is a bimetallic catalyst capable of producing a bimodal polymer in a single reactor.

EXAMPLES

In order to provide a better understanding of the foregoing description, the following non-limiting examples are offered. In the following examples, several types of purification material, feed streams, purification beds, and olefin polymerization catalysts were used. Examples 1–6 illustrate oxygen removal at temperatures above 80° C. as well as generation of carbon dioxide at these temperatures when oxygen is present in ethylene. Examples 7, 8 and 9 illustrate removal of oxygen at ambient temperature without generating carbon dioxide. Example 10 illustrates removal of both oxygen and carbon monoxide at ambient temperature. All drying conditions were carried out at ambient conditions. Table 1 summarizes the feed stream conditions and the compositions of the feed streams entering and exiting the packed bed for oxygen removal. Table 1, therefore, illustrates the amount of oxygen removed and the amount of carbon dioxide generation, if any.

Comparative Example 1

Ethylene containing less than 0.1 ppmv of oxygen was passed through a first packed bed to remove oxygen. The first packed bed had a diameter of 9.8 inches and length of 8 feet. The first packed bed contained UT-2000 material, which is obtainable from Univation Technologies, LLC. The UT-2000 material was in its reduced state for oxygen removal. The flow rate of ethylene through the bed was about 250 lb/hr. The bed was maintained at 100° C. and had an operating pressure of 550 psig. The ethylene then passed through a second packed bed for removal of carbon monoxide. The second bed contained the UT-2000 de-oxo material in its oxidized state for carbon monoxide removal. After the second packed bed, the ethylene was cooled to a temperature of 30° C., and fed to a third packed bed (dryer) to remove water using 3A molecular sieves from UOP. The ethylene was then passed through a fourth packed bed to remove carbon dioxide using a mixture of Selexsorb® COS and Selexsorb® CD material available from Alcoa. As shown in Table 1, the oxygen concentration measured in the purified ethylene exiting the first parked bed was below 5 ppbv, and the increase in concentration of carbon dioxide in the ethylene exiting the first packed bed was about 0.1 ppmv.

Comparative Example 2

Nitrogen containing from 0.6 to 2.0 ppmv of oxygen was passed through a first packed bed of UT-2000 de-oxo material to remove oxygen. The first packed bed also had a diameter of 9.8 inches and length of 8 feet. The flow rate of nitrogen through the bed was about 300 lb/hr. The bed was maintained at 100° C. and had an operating pressure of 550 psig. The nitrogen was then cooled to a temperature of 30° C., and fed to a dryer to remove water using 13X molecular sieves from UOP. As shown in Table 1, the oxygen concentration measured in the purified nitrogen was below 5 ppbv.

Comparative Example 3

Ethylene containing 3.1 ppmv of oxygen was passed through a first packed bed of UT-2000 de-oxo material to remove oxygen. The first packed bed had a diameter of 9.8 inches and length of 8 feet of the UT-2000 deoxo material. The flow rate of ethylene through the bed was about 250 lb/hr. The bed was maintained at 98° C. and had an operating pressure of 550 psig. The ethylene then passed through a second packed bed for removal of carbon monoxide. From the second packed bed, the ethylene was cooled to a temperature of 30° C., and fed to a third packed bed to remove water and fourth packed bed to remove carbon dioxide as described above in Comparative Example 1. As shown in Table 1, the oxygen concentration measured in the purified ethylene was below 5 ppbv, and the increase in concentration of carbon dioxide in the ethylene exiting the bed of UT-2000 was about 0.4 ppmv.

Comparative Example 4

Ethylene containing 10 ppmv of oxygen was passed through a packed bed of material to remove oxygen. The packed bed had a diameter of 2 inches and length of 5 feet. The packed bed contained T-4427B material, which is commercially available from Sud-Chemie. The flow rate of ethylene through the bed was 40 lb/hr. The bed was maintained at 100° C. and had an operating pressure of 550 psig. As shown in Table 1, the purified ethylene exiting the packed bed of T-4427B material contained less than 5 ppbv of oxygen but about 3.5 ppmv more carbon dioxide than the inlet ethylene.

Comparative Example 5

Ethylene containing less than 0.1 ppmv of oxygen was passed through a packed bed of T-4427B material. The packed bed had a diameter of 2 inches and length of 5 feet. The flow rate of ethylene through the bed was 40 lb/hr. The bed was maintained at 99° C. and had an operating pressure of 550 psig. As shown in Table 1, the purified ethylene exiting the packed bed of T-4427B material measured less than 5 ppbv of oxygen but the concentration of carbon dioxide in the ethylene exiting the bed increased by about 0.65 ppmv.

Comparative Example 6

Ethylene containing less than 0.1 ppmv of oxygen was passed through a packed bed of T-4427B material. The packed bed had a diameter of 2 inches and length of 5 feet. The flow rate of ethylene through the bed was 40 lb/hr. The bed was maintained at 80° C. and had an operating pressure of 550 psig. As shown in Table 1, the purified ethylene exiting the packed bed of T-4427B material measured less than 5 ppbv of oxygen, but the concentration of carbon dioxide in the ethylene exiting the bed increased by about 0.1 ppmv.

Example 7

Nitrogen containing from 2.0 to 2.6 ppmv of oxygen was passed through a first packed bed of UT-2000 de-oxo material to remove oxygen. The packed bed had a diameter of 9.8 inches and length of 8 feet. The flow rate of nitrogen through the bed was about 300 lb/hr. The bed was maintained at a temperature between 13° C. and 30° C., and had an operating pressure of 550 psig. The nitrogen was then fed to a dryer to remove water using 13X molecular sieves from UOP. As shown in Table 1, the oxygen concentration measured in the purified nitrogen was below 5 ppbv and no increase in carbon dioxide concentration was detected.

Example 8

Ethylene containing 10 ppmv of oxygen was passed through a packed bed of UT-2000 de-oxo material. The packed bed had a diameter of 9.8 inches and length of 8 feet. The flow rate of ethylene through the bed was 40 lb/hr. The bed was maintained at 20° C. and had an operating pressure of 550 psig. As shown in Table 1, the oxygen concentration measured in the purified ethylene remained below 5 ppbv and no increase in carbon dioxide concentration was detected.

Example 9

Ethylene containing 10 ppmv of oxygen was passed through a packed bed of material to remove oxygen. The packed bed had a diameter of 2 inches and length of 5 feet. The packed bed contained T-4427B material, which is commercially available from Sud-Chemie. The flow rate of ethylene through the bed was 40 lb/hr. The bed was maintained at 3° C. and had an operating pressure of 550 psig. As shown in Table 1, the oxygen concentration measured in the purified ethylene remained below 5 ppbv and no increase in carbon dioxide concentration was detected.

Example 10

Nitrogen containing 2.6 ppmv of oxygen and 0.5 ppmv of carbon monoxide was passed through a packed bed of UT-2000 de-oxo material in its reduced state to remove oxygen. The packed bed had a diameter of 9.8 inches and length of 8 feet. The flow rate of nitrogen through the bed was about 300 lb/hr. The bed was maintained at a temperature between 26° C.–30° C. and had an operating pressure of 550 psig. The nitrogen was then fed to a dryer to remove water using 13X molecular sieves from UOP. As shown in Table 1, the oxygen concentration measured in the purified nitrogen was below 5 ppbv and the carbon monoxide concentration was about 0.1 ppmv. No increase in carbon dioxide concentration was detected.

In Comparative Examples 1, 2, and 3 and Examples 7, 8, and 10, the purified ethylene and/or nitrogen streams were fed to one or more gas phase polymerization reactors to produce polyethylene. Various ethylene polymerization catalysts were used, including a Ziegler-Natta ($TiCl_3$-based) catalyst, chromium-based catalyst, and metallocene catalyst. As shown in Table 2 below, the feed streams produced polyethylene with excellent physical properties and provided excellent catalyst activity.

TABLE 2

Polymerization conditions and product results.

| Catalyst type | Cr based | Ziegler-Natta | Metallocene |
| --- | --- | --- | --- |
| Reactor Pressure, psig | 390 | 324 | 348 |
| Reactor Temperature, ° C. | 111 | 87 | 85 |
| Ethylene Partial Pressure, psi | 220 | 105 | 210 |
| Comonomer | 1-Hexene | 1-Hexene | 1-Hexene |
| Catalyst productivity, lb/lb | 3600 | 16400 | 5600 |
| Resin Density, g/cm$^3$ | 0.955 | 0.9166 | 0.92 |
| Melt Index I2, dg/min | 0.45 | 0.5 | 2.1 |
| Flow Index I21, dg/min | 30 | 14.5 | 68 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

TABLE 1

Stream compositions.

| | INLET COMPOSITION TO FIRST PACKED BED | | | OUTLET COMPOSITION FROM FIRST PACKED BED | | |
| --- | --- | --- | --- | --- | --- | --- |
| | $O_2$ ppmv | CO ppmv | $CO_2$ ppmv | $O_2$ ppbv | CO ppmv | $CO_2$ ppmv |
| Comp Ex. 1 | 0.1 | 0.1 | 0.5 | <5 | 0.1 | 0.6 |
| Comp Ex. 2 | 0.6–2.0 | 0 | 0 | <5 | 0 | 0 |
| Comp Ex. 3 | 3.1 | 0.1 | 0.3 | <5 | | 0.65 |
| Comp Ex. 4 | 10 | 0.1 | 0.35 | <5 | | 3.6 |
| Comp Ex. 5 | 0.1 | 0.1 | 0.2 | <5 | | 0.85 |
| Comp Ex. 6 | 0.1 | 0.1 | 0.2 | <5 | | 0.3 |
| Ex. 7 | 2.0–2.6 | 0 | 0 | <5 | 0 | 0 |
| Ex. 8 | 10 | 0.1 | 0.5 | <5 | | 0.5 |
| Ex. 9 | 10 | 0.1 | 0.5 | <5 | | 0.5 |
| Ex. 10 | 2.6 | 0.5 | 0 | <5 | 0.1 | 0 |

What is claimed is:

1. A method for olefin polymerization, comprising:
providing a feed stream comprising more than 0.1 ppm by volume of oxygen and 0.3 ppm by volume of water;
passing the feed stream through a first packed bed to selectively remove at least a portion of the oxygen;
passing the feed stream through a second packed bed to selectively remove at least a portion of the water, providing a purified feed stream comprising less than 0.1 ppm by volume of oxygen and 0.3 ppm by volume of water, wherein both the first and second packed beds operate at a temperature of from about 0° C. to about 50° C.; and then
passing the purified feed stream to a polymerization reactor.

2. The method of claim 1, wherein the feed stream is not externally heated or cooled between the first and second packed beds.

3. The method of claim 1, wherein the first packed bed comprises reduced copper supported on a metal oxide carrier and the second packed bed comprises one or more adsorbents selective for water.

4. The method of claim 1, wherein the feed stream comprises ethylene.

5. The method of claim 1, wherein both the first and second packed beds operate at a temperature of from about 20° C. to about 40° C.

6. The method of claim 1, wherein the feed stream comprises nitrogen.

7. A method for olefin polymerization, comprising:
providing a feed stream comprising more than 5 ppm by volume of acetylene, 0.5 ppm by weight of sulfur-containing compounds, 0.3 ppm by volume of carbon monoxide, 0.5 ppm by volume of carbon dioxide, 0.1 ppm by volume of oxygen, 0.3 ppm by volume of water, and 1 ppm by volume of methanol;
passing the feed stream through a first packed bed to selectively remove at least a portion of the sulfur-containing compounds;
passing the feed stream through a second packed bed to selectively remove at least a portion of the acetylene and oxygen;
passing the feed stream through a third packed bed to selectively remove at least a portion of the carbon monoxide;
passing the feed stream through a fourth packed bed to selectively remove at least a portion of the carbon dioxide, water, and methanol, providing a purified feed stream comprising less than 5 ppm by volume of acetylene, 0.5 ppm by weight of sulfur-containing compounds, 0.3 ppm by volume of carbon monoxide, 0.5 ppm by volume of carbon dioxide, 0.1 ppm by volume of oxygen, 0.3 ppm by volume of water, and 1 ppm by volume of methanol, wherein the first, second, third and fourth packed beds each operate at a temperature of from about 0° C. to about 50° C.; and then
passing the purified feed stream to a polymerization reactor.

8. The method of claim 7, wherein the feed stream is not externally heated or cooled between the four packed beds.

9. The method of claim 7, wherein the feed stream is not externally heated between the first and second packed beds.

10. The method of claim 7, wherein the reduced metal-containing reactant comprises copper supported on a metal oxide carrier.

11. The method of claim 7, wherein the feed stream comprises ethylene gas or nitrogen gas.

12. The method of claim 7, wherein the olefin polymerization is carried out in the gas phase.

13. A method for olefin polymerization, comprising:
passing an olefin feed stream comprising from 0.1 to 5 ppm by volume of oxygen through a packed bed comprising a reduced metal-containing reactant that chemically reacts with at least a portion of the oxygen and generates carbon dioxide, wherein the reaction takes place at conditions sufficient to produce less than 0.3 ppm by volume of the carbon dioxide, thereby providing a purified olefin feed stream having less than 0.1 ppm by volume of oxygen and less than 0.3 ppm by volume of additional carbon dioxide, and then
passing the purified olefin feed stream to a polymerization reactor, the reactor housing a fluidized bed comprising a polymerization catalyst sensitive to oxygen and carbon dioxide.

14. The method of claim 13, wherein the conditions sufficient to produce less than 0.3 ppm by volume of the carbon dioxide comprises a reaction temperature of from 0° C. to 90° C.

15. The method of claim 13, wherein the reduced metal-containing reactant comprises copper supported on a metal oxide carrier.

16. The method of claim 13, wherein the polymerization catalyst is a Ziegler-Natta type catalyst, chromium-based catalyst, or metallocene catalyst.

17. The method of claim 13, wherein the feed stream comprises ethylene.

18. The method of claim 13, wherein the olefin polymerization is carried out in the gas phase.

19. The method of claim 13, wherein the polymerization catalyst is a bimetallic catalyst capable of producing a bimodal polymer in a single reactor.

* * * * *